Nov. 26, 1929.　　　J. F. HAAS　　　1,736,970
POWER DRIVEN TOOL
Filed March 16, 1927
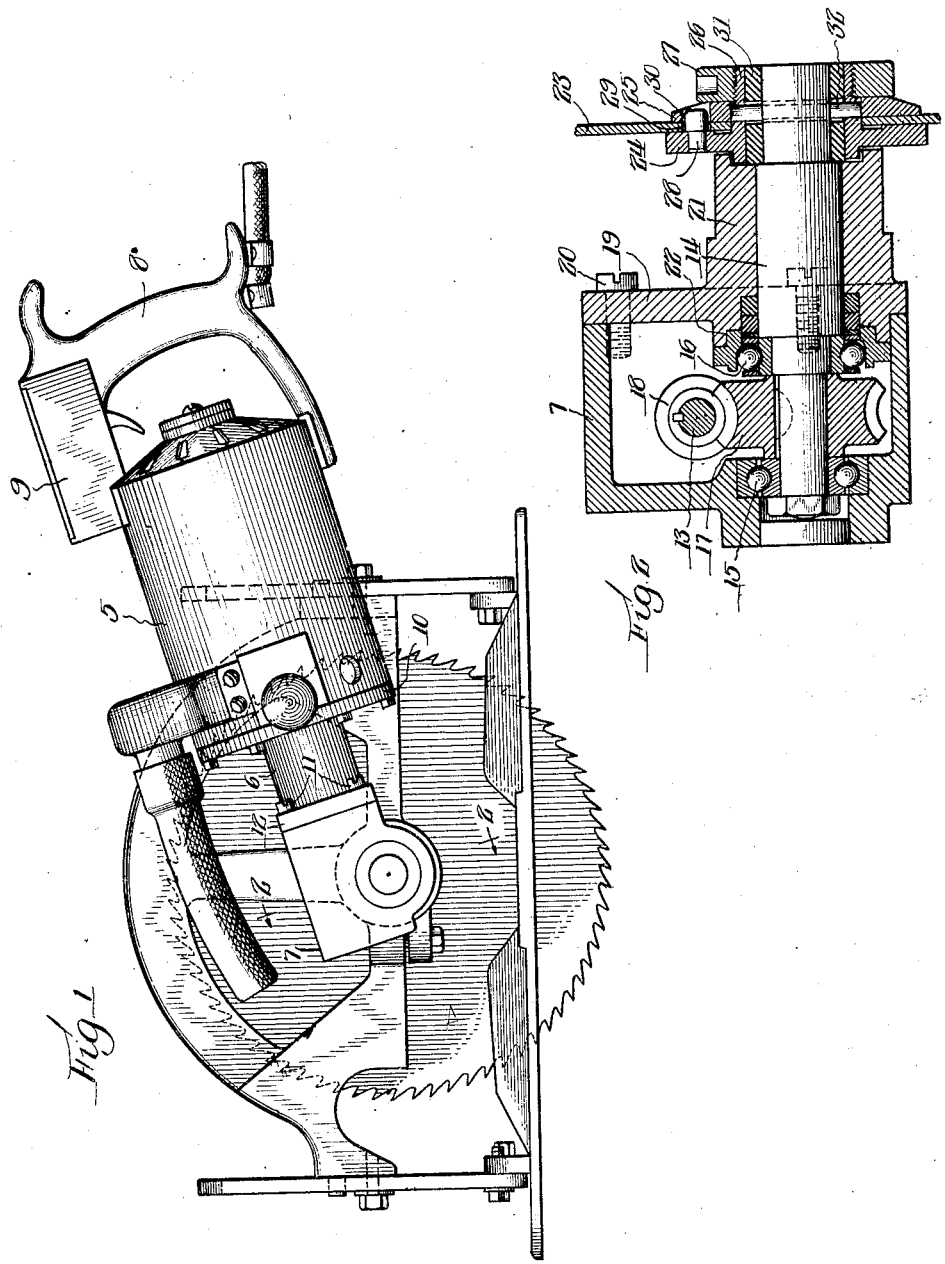
Inventor:
Joseph F. Haas, Patented Nov. 26, 1929

1,736,970

UNITED STATES PATENT OFFICE

JOSEPH F. HAAS, OF FOREST PARK, ILLINOIS, ASSIGNOR TO WODACK ELECTRIC TOOL CORPORATION, OF CHICAGO, ILLINOIS, A CORPORATION OF ILLINOIS

POWER-DRIVEN TOOL

Application filed March 16, 1927. Serial No. 175,651.

The invention relates to power driven tools, and more particularly to portable power driven circular saws.

In portable tools of this general type a serious obstacle has been encountered, in that an objectionable vibration is set up in the use of the tool, which causes a chattering of the tool when applied to the work and a consequent inefficient performance together with a tiring effect upon the operator. This vibration, I have discovered, is due to the fact that the rapidly revolving cutting tool—and this is especially true in the case of a circular saw blade—does not have a true dynamic balance. The primary object of this invention therefore is to produce a portable tool in which the rotating part is mounted in a novel and advantageous manner so that it may, in operation, find and rotate about its true center of gravity.

Other objects and advantages will become apparent from the following description and in the accompanying drawings in which Figure 1 is a side elevation of a power driven rotary tool in which the invention may be used.

Fig. 2 is an enlarged section of the bearing assembly taken on a line 2—2 of Fig. 1 showing the preferred form of the invention.

While I have shown in the drawings and will herein describe in detail the preferred embodiment of the invention, it is to be understood that I do not thereby intend to limit the invention to the specific form disclosed, but aim to cover all modifications and alternative constructions falling within the scope of the invention as expressed in the appended claims.

The tool selected for the purposes of disclosure, comprises generally an electric motor carried and housed in an aluminum casing 5. This casing has, at one end, an axially extending tubular shell 6 which in turn provides a support for a bearing housing 7. To the opposite end of the motor casing 5 any preferred form of hand grip 8 may be suitably affixed, and an electric control switch 9 may be mounted upon the handle at a point convenient for actuation by the operator while grasping the handle.

As may be seen in Fig. 1, the tubular shell 6 is preferably formed integrally with a circular disk or plate 10 arranged to close the casing 5 at that end. The bearing housing 7 is secured to the tubular shell by means of bolts 11 passing through an aperture in an end flange 12 thereon into threaded engagement with the housing. The armature shaft of the motor extends into the tubular shell 6 and a short shaft 13 (Fig. 2) suitably journalled in ball bearings in the housing as arranged to be a continuation thereof. Preferably a separable driving connection therebetween is provided by squaring the adjacent ends of these shaft and connecting them by means of an internally squared sleeve coupling (not shown).

A tool arbor 14 is journaled in the housing 7 in ball bearings 15 and 16 at right angles to the short shaft 13. A worm gear 17 keyed to the arbor 14 is arranged to mesh with a worm 18 on the shaft 13 to provide a driving connection between the motor and the tool arbor.

In the present instance one side of the housing 7 is closed by a plate 19 secured in place by means of the bolts 20. The plate has integrally formed thereon an outwardly projecting tubular member 21 adapted to receive and support the arbor 14 externally of the housing 7. The inner edge of the tubular member may be recessed, as at 22, to provide a seat for the ball bearing 16. Thus the arbor 14 is supported within the housing 7 by the bearings 15 and 16 and externally throughout substantially its entire length by the tubular member 21.

The preferred manner in which the tool is mounted upon the arbor for self-centering adjustment comprises a means for securing the tool upon the arbor for rotation therewith, which permits at the same time a slight yielding movement of the tool transversely of the arbor. Briefly stated this means comprises a tool supporting sleeve or carrier mounted upon the arbor through the medium of a bushing of rubber or other suitable resilient material, the carrier being held against rotation on the arbor so as not to destroy the yielding or floating character of its support.

Referring now to the drawings, a tool, such as a saw blade 23, is clamped between collars 24 and 25, the inner collar 24 having a sleeve portion 26 upon which the saw 23 and the collar 25 may be positioned. A nut 27 engaging screw threads upon the sleeve serves to clamp the collars and the saw rigidly together. To prevent relative rotational travel of the saw and various elements of the carrier, a pin 28 carried by the collar 24 is adapted to enter suitable apertures 29 and 30 provided in the saw blade 23 and the collar 25.

Interposed between the sleeve 26 and the arbor 14 is a yieldable bushing 31 of a suitable resilient material, such as rubber, to permit radial movement of the carrier relative to the arbor. The sleeve portion 26 and the bushing 31 are adapted to fit over the free end of the arbor 14 and to bear lightly against a bearing surface formed on the free end of the tubular member 21. To provide a positive and unyielding driving connection between the arbor and saw carrier a pin 32 is entered through alined apertures in the sleeve 26, flexible bushing 31 and the arbor 14 respectively. Preferably the apertures in the arbor and bushing are slightly larger than the pin 32 to permit relatively free radial movement of the saw and its carrier. Thus a slight but relatively free movement of the saw blade carrier relative to the arbor is attained.

It will be seen that while relative rotational travel of the saw about the arbor is prevented by the pin 32, the saw may be said to be "floated" upon the arbor. Thus when the arbor is rotating rapidly, the saw will automatically find its true center of gravity and rotate thereabout without vibration.

From the foregoing it will be apparent that a bearing for a tool has been provided which will permit the tool automatically to determine its own center of rotation, thus eliminating all the vibration which results from a member rotating at a high rate of speed about an eccentric or imperfectly located center of balance.

The tool as illustrated, discloses a guide rest or base for supporting the tool upon the work. Claims directed to this feature of the construction are contained in my copending application Serial No. 175,652, filed March 16, 1927.

I claim as my invention:

1. A portable power driven tool having, in combination, a housing, a driven arbor journaled in said housing, a sleeve having an annular collar thereon and arranged to be positioned on the free end of said arbor, a saw blade and a second collar each adapted to fit over said sleeve, means for securing said saw and said second collar on said sleeve with said saw between the two collars, means for fastening said sleeve to said arbor including a pin extending radially through alined openings in said arbor and sleeve and held in position by said second collar, said pin being snugly held in said sleeve but relatively loose in said arbor, and a yieldable bushing interposed between said sleeve and said arbor to permit said sleeve and the parts carried thereon to become "self-centered" during rotation thereof.

2. A portable power driven tool having, in combination, a frame, a driven arbor journaled in said frame, a sleeve arranged to be positioned on the free end of said arbor, a saw blade having a central opening adapted to receive said sleeve, means for holding the blade in position on the sleeve, means securing said sleeve on said arbor comprising a pin extending radially through alined openings in said sleeve and arbor, said opening in said arbor being larger than said pin to permit radial and lateral movement of said pin relative thereto, and a yieldable bushing interposed between said sleeve and said arbor to permit said saw to move in its true centrifugal path during rotation.

3. A power driven tool having, in combination, a frame, an arbor journalled on said frame, a tool carrier arranged to be positioned on the said arbor, a cutting tool mounted on said carrier to rotate therewith, a driving connection between said arbor and carrier comprising a pin extending through openings in said carrier and arbor, the opening in one of said parts being larger than the pin to permit radial movement of the carrier relatively to the arbor, and a yieldable bushing interposed between said carrier and said arbor.

4. In a power driven tool, the combination of a driven arbor, a saw blade, a carrier for said blade having an internal diameter substantially greater than the diameter of the arbor, a bushing of yieldable material interposed between the carrier and the arbor for yieldingly supporting said carrier on the arbor, and means providing a positive rotative driving connection between said carrier and the arbor but adapted to permit slight radial movement of the carrier in the yielding of the bushing.

5. A portable tool having, in combination, a housing, a spindle journaled in said housing and projecting therefrom, a cutting tool in the form of a circular blade, a carrier for said blade comprising a sleeve having a radial flange, means coacting with said flange to secure the blade on the carrier and providing a rotative driving connection between said carrier and the blade, said sleeve having an internal diameter substantially greater than the diameter of the outer end of the spindle and having a positive driving connection with the spindle, and a bushing of yieldable material interposed between said sleeve and said spindle.

In testimony whereof, I have hereunto affixed my signature.

JOSEPH F. HAAS.